Figure 10:
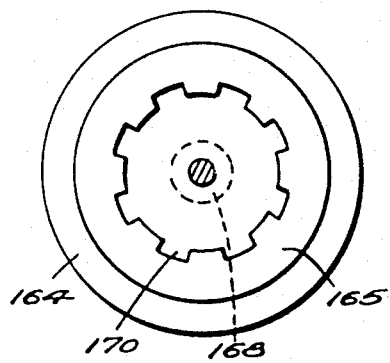

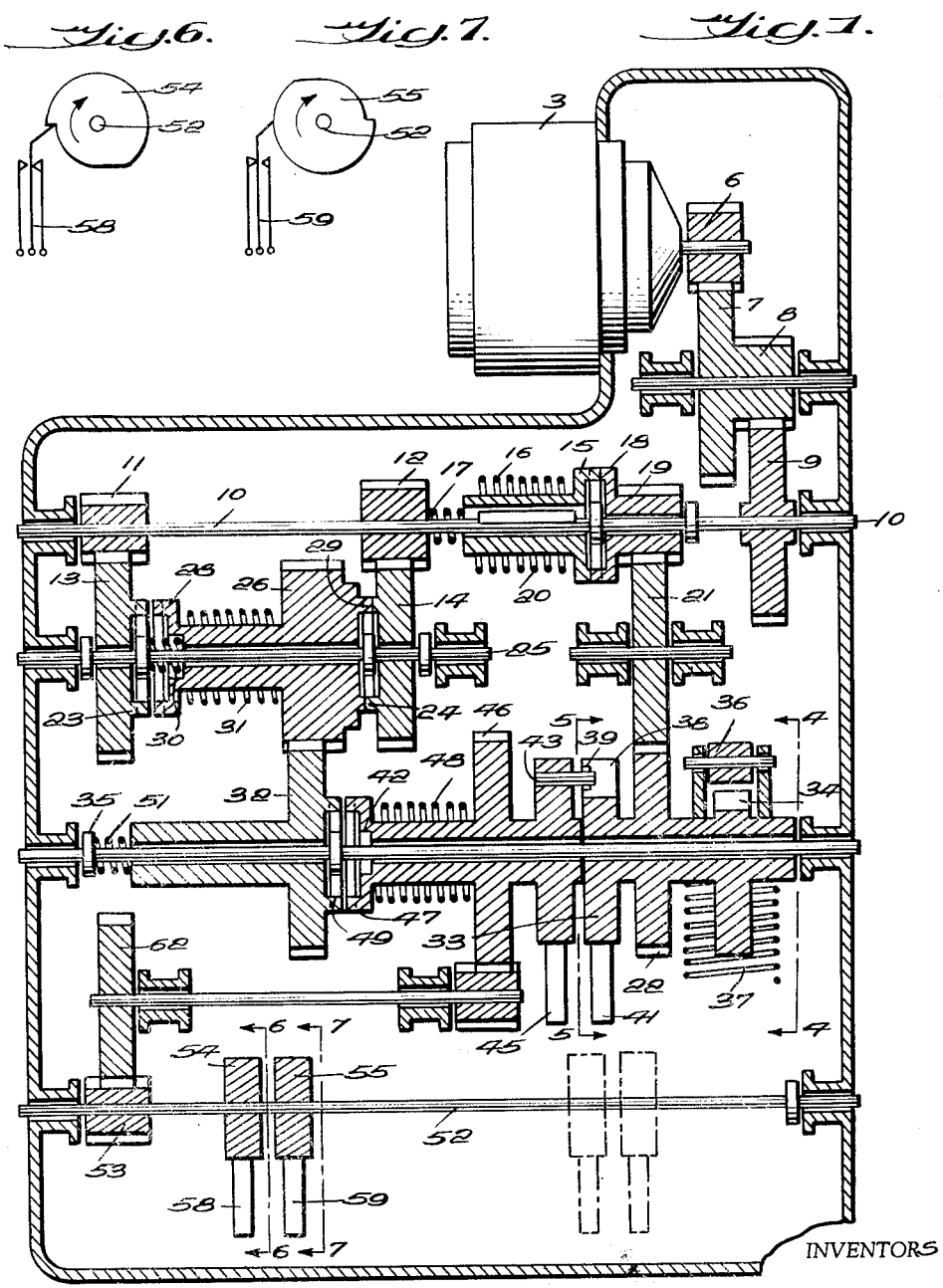

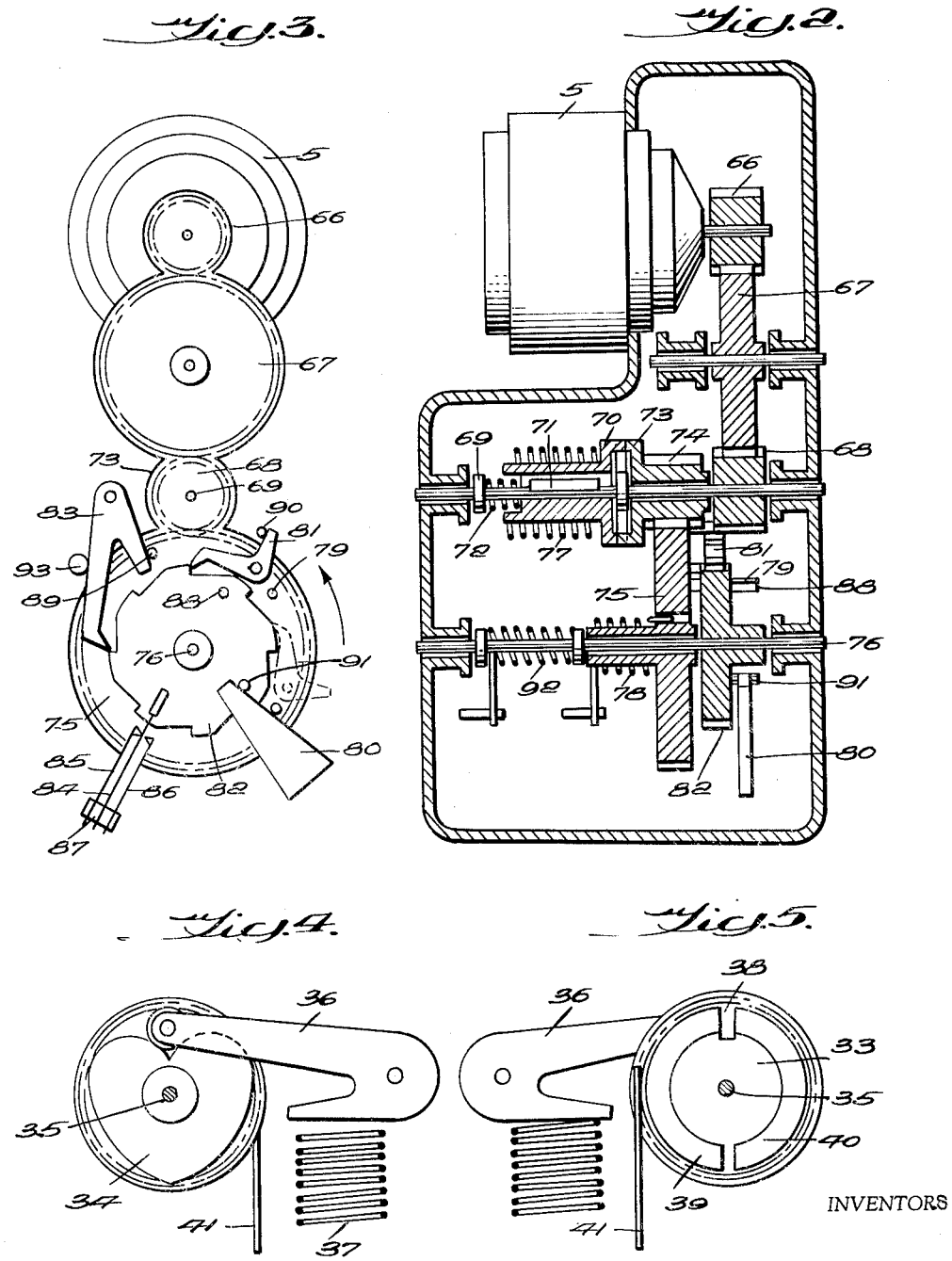

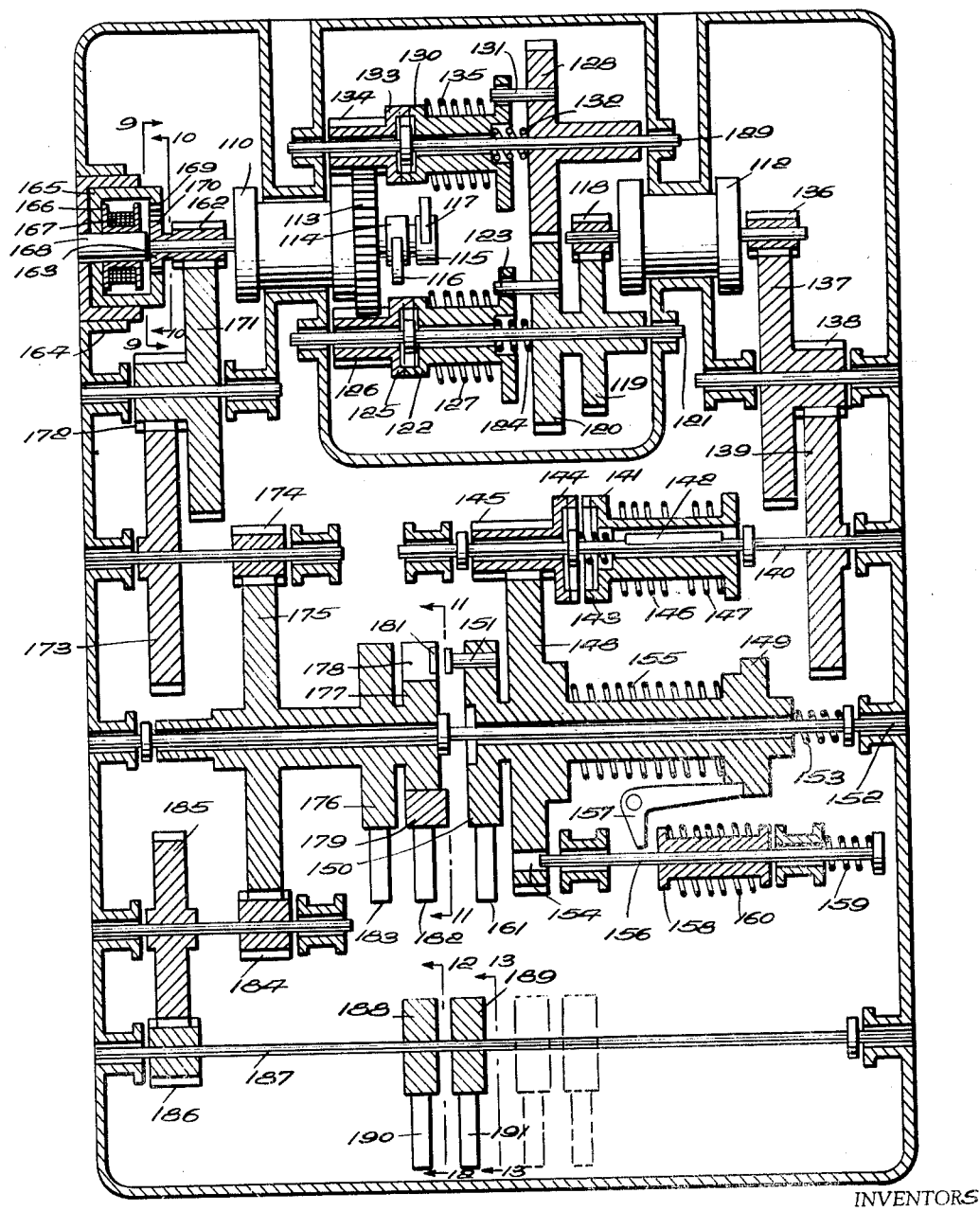

Oct. 26, 1965 V. PFEFFER ETAL 3,213,602
APPARATUS FOR REMOTE CONTROL OF A CLOCK SYSTEM
Filed Dec. 12, 1961 6 Sheets-Sheet 4

INVENTORS
VACLAV PFEFFER,
BOZENA PFEFFEROVA,

BY Paul H. Smother
ATTORNEY

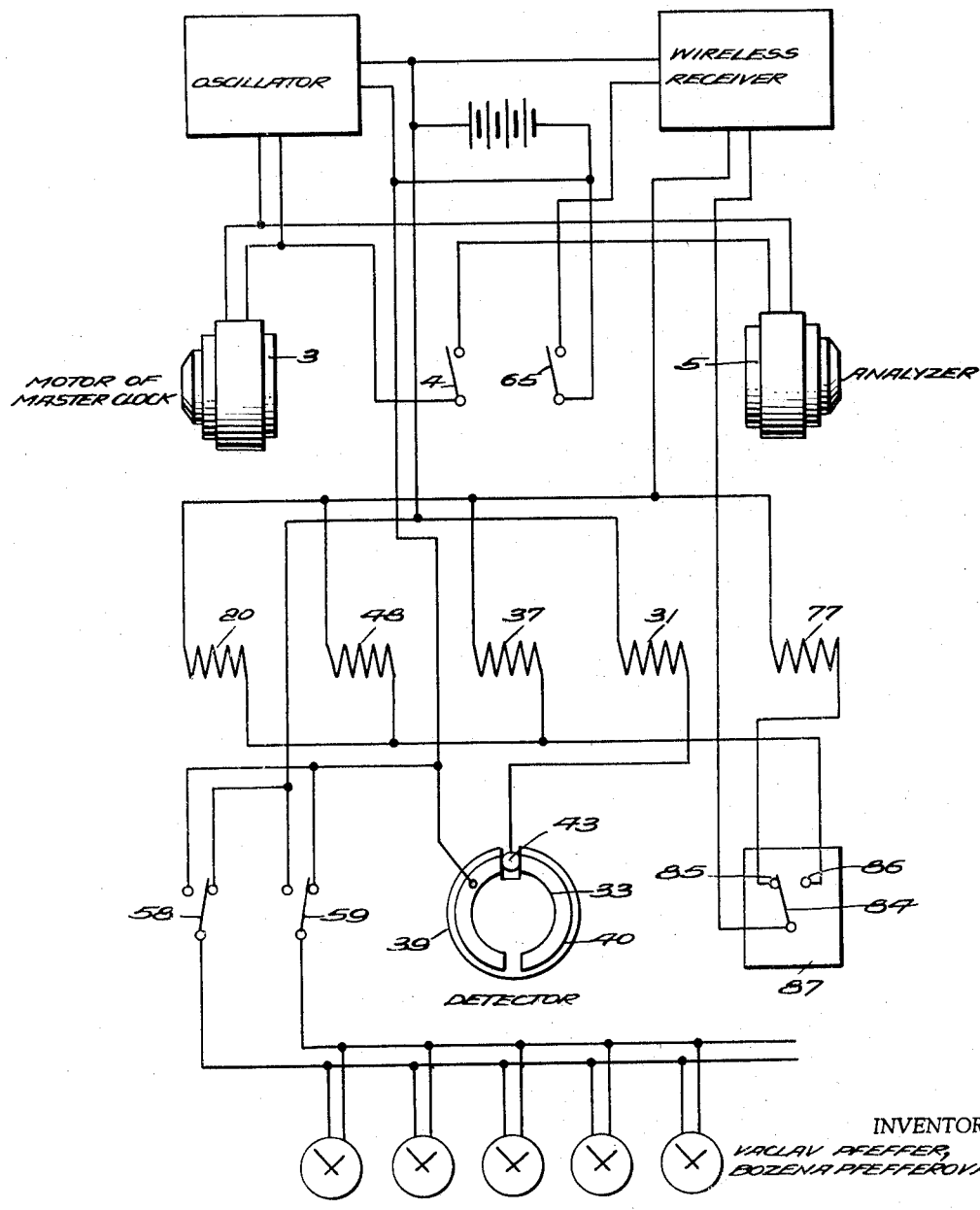

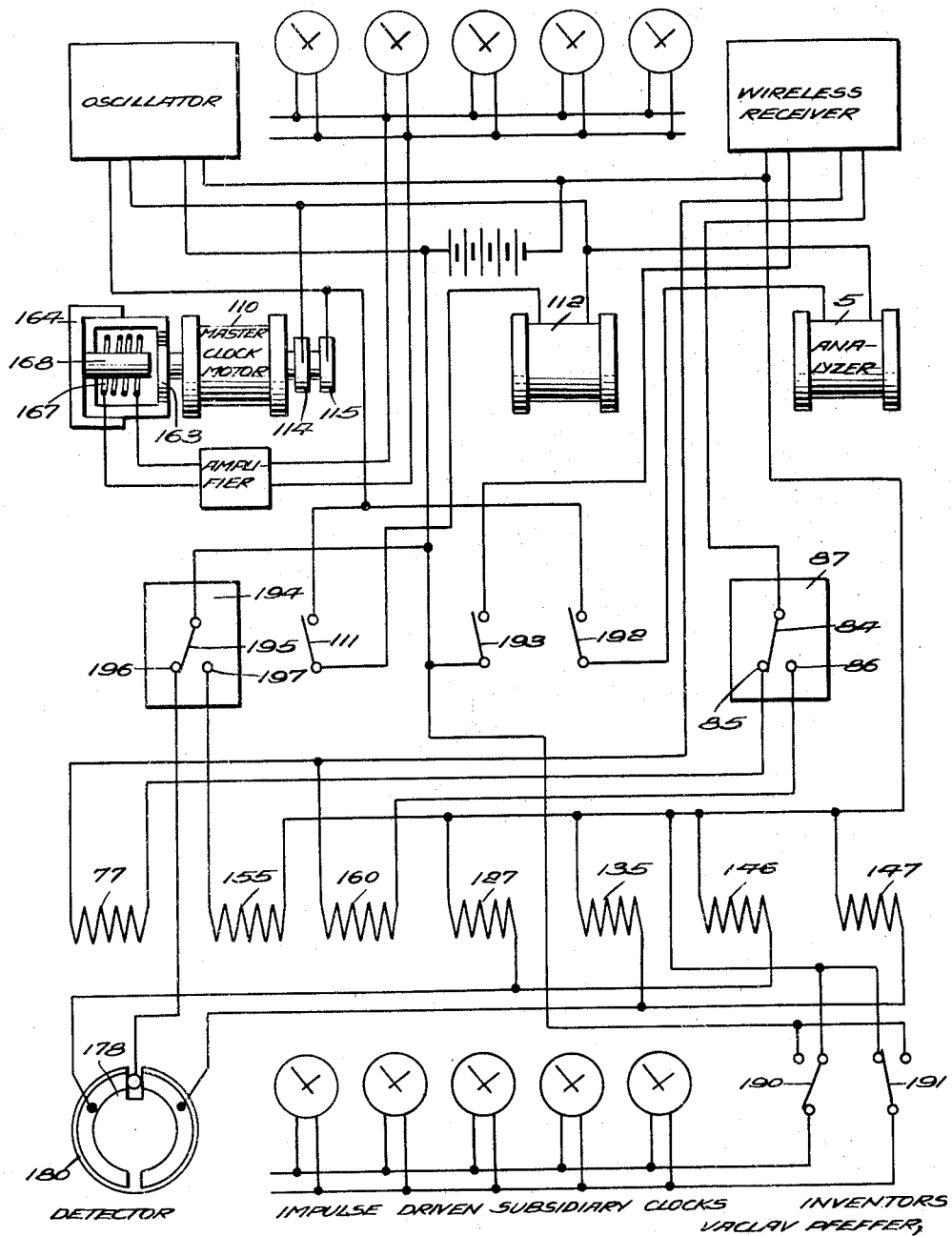

United States Patent Office 3,213,602
Patented Oct. 26, 1965

3,213,602
APPARATUS FOR REMOTE CONTROL
OF A CLOCK SYSTEM
Václav Pfeffer and Bŏzena Pfefferová, Prague, Czechoslovakia, assignors to Elektrocas, narodni podnik, Prague, Czechoslovakia
Filed Dec. 12, 1961, Ser. No. 158,837
Claims priority, application Czechoslovakia, Dec. 21, 1960, PV 7,631/60; Feb. 16, 1961, PV 931/61
19 Claims. (Cl. 58—35)

The present invention relates to improvements in a system for wireless regulation of a master-clock and of subsidiary clocks actuated thereby.

The steadily growing need of a universal time base has led already to the design of different remotely controlled master clocks. In the first stages such clocks, as used mainly on some railway systems, have been controlled by a special signal transmitted over telegraph wires. This system depended however on the existence of a transmission line. More recent systems solved therefore the remote control by wireless signals and some of said systems correct the deviation by the change of frequency of a pendulum. The direct action of a series of correcting signals is used for this purpose. This method requires a prolonged control action which is easily liable to failures due to parasite signals. Other systems use an artificially produced lead which is compensated by an intermittent disengaging of an actuating wheel from the actual drive of a pendulum. As this one-way compensation forbids the compensation of any slightest time lag, the lead must be as large so as to be maintained at all circumstances. This system therefore supposes a predetermined substantial deviation.

A further drawback common to all arrangements according to said systems is the need of a pendulum clock. Thus it becomes large and its use limited. Such clocks require quiet working conditions and it is impossible to install them for instance in transport means.

It has been already proposed according to the U.S. patent specification No. 2,614,383 and to the British patent specification No. 648,747 to use for the control of the master-clock time signals transmitted by broadcasting stations. This system does not suppose the provision of a pendulum clock and can be used under any circumstances. The compensation of this deviation is achieved by influencing the signal transmitter for the drive of subsidiary clocks without having any effect upon the movement of the proper clockwork. It takes place by the action of the last element of the signal combination. A wrong adjustment is prevented by the so called "analyzer," provided with its own time measuring device.

As the remote control influences only the function of the master clock, the deviation must be compensated prior to its being transmitted by the signal transmitter to the corresponding system of subsidiary clocks. Time signals transmitted for insance each sixth hour can be due to a failure of the transmitter or due to an occasional fading temporarily obscured. In order to be able to achieve the correction by the next signal even at these circumstances, the machine of the said system must be able to drive the subsidiary clocks within intervals which are positively longer than the time interval caused by the accumulation of errors. So, for instance, a clock system controlled by a machine of an accuracy of $10^{-4}$ can be driven at the maximum within intervals of a quarter of a minute. This accuracy can be however achieved with difficulties with a mechanical clock, the movement of which is controlled by steps.

The development of technics and the ever increasing speed of transport means requires not only a universal time unification, but brings also the requirements of a more perfect time orientation. Intervals of one minute are no more satisfactory for the control and in the near future intervals of half a minute will be no more sufficient. Information transmitted each quarter of a minute cannot be used efficiently as their reading is generally not reliable.

There are known clocks measuring the time with such an accuracy that their deviations are for the needs of the practical life negligible. Even mechanical clocks with a pendulum achieve in a suitable medium the accuracy up to $10^{-7}$. Electronically controlled systems are even more perfect. For instance the quartz crystal clocks have a guaranteed stability of $10^{-8}$. The most recent systems, the so called atomic clocks achieve an accuracy of $10^{-11}$.

The said systems developed exclusively for scientific purposes are however too expensive. Even the oscillators which achieve this accuracy are so expensive that they cannot be used as master-clocks. Their use as central organs caring for the control in wide areas by means of existing telecommunicating systems is however not advantageous for two reasons. First there is a large liability to failures of such a wide-spread network which does not guarantee the reliability of the time indication, in addition there are places or objects which do not have means of telecommunication or which cannot be connected by means of wires, as for instance ships or all moving objects.

In accordance with this invention the said drawbacks are eliminated by an entirely new arrangement which solves the remote control of whole clock systems by wirelessly transmitted time signals, where their exactly checked receipt in case of a deviation with the correct time immediately prepares the change of the movement of the master-clock and furthermore determines the character and extent of the deviation, whereby in the course of its further movement it temporarily transmits in accordance with the determined deviation further signals within slightly prolonged or shortened intervals as long as according to the measured deviation a perfect compensation of this deviation of the whole system has been achieved. In other words each deviation is decomposed into a number of correction impulses by means of which the intervals of the signals transmitted to the subsidiary clocks are slightly prolonged or shortened up to the complete agreement with the correct time. As time base an oscillator is used by means of which the motor of the master-clock is driven and in case of a control by time signals also the motor of the decoding analyzer of the correcting time signals. A detector of the character and extent of the time deviation with a zero device and a correcting change-over switch of the gearings of a different, prior adjusted transmission ratio is included in the proper clockwork. The detector with the zero device forms advantageously a unit which is within a short disconnecting period brought to the initial position by a suitable coupling by means of a zero lever and which unit cooperates with a free disc provided with a detector stud, which drives the signal transmitters for the subsidiary clocks and which itself is driven either from the main transmission or from correcting change-over transmission gears of a different, prior adjusted transmission ratio.

These changes of the length of the time intervals between impulses transmitted to subsidiary clocks achieved by a mechanical changing of different transmission ratios, can be used only for clock systems with impulse drives. Their subsidiary clocks drive their pointers on the dials by sudden movements at intervals determined by the master-clock. Thus even in case of a very careful design they will be audible even at a very low noise level or they at least increase this level so that they are not suitable for silent working conditions.

In accordance with this invention this drawback is eliminated by such a control of the movement of whole clock systems, where for a change of the movement of the master-clock in case of a deviation with respect to the correct time, a device is brought into action, which together with the impulse system controls equally the frequency controlled time system, where the time indication is taken over by synchronous motors with a silent movement and with a continuous movement of the pointers on the dial. They of course require a continuous supply of current and a much larger power supply than subsidiary clocks of impulse systems. They ought to be therefore installed only where a silent movement is required.

The oscillator of such associated clock systems drives continuously a main synchronous motor with a mobile stator and in case of a compensating action also an auxiliary synchronous motor causing the change of the angular speed of the main motor, and a motor of the decoding analyzer of correcting time signals. Between the stator of the main synchronous motor and the auxiliary synchronous motor two disengageable transmissions for the movement of the stator in opposite directions are provided. They guarantee under normal operating conditions by a continuous engagement with the stator its stability and only by their alternate disengaging in case of deviations with respect to the correct time by a temporary change of the angular speed of the resulting movement of the main synchronous motor an acceleration or deceleration of both systems to the correct time is achieved. The main synchronous motor is therefore the organ, which drives the impulse system of the subsidiary clocks and the rotor of the generator for continuous pick-up of the angular speed by an electromagnetic, capacitive or electrodynamic arrangement. The extent of the continuous change of frequency in the positive and negative sense is given by the prior adjusted transmission ratios of both couplings between the auxiliary synchronous motor and the stator of the main synchronous motor. With the auxiliary synchronous motor a further time determinator is coupled over a further coupling, which determinator is maintained in its initial position by a catch and safeguarded against rotation by a setting shaft, which remains in engagement even after release of the catch and is disengaged only at the end of the last impulse of the time signal in complete accordance with the exact time.

Figure 9:
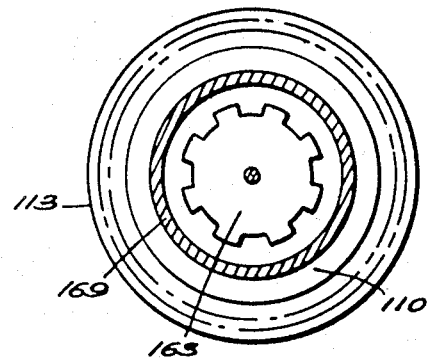
Figure 11:
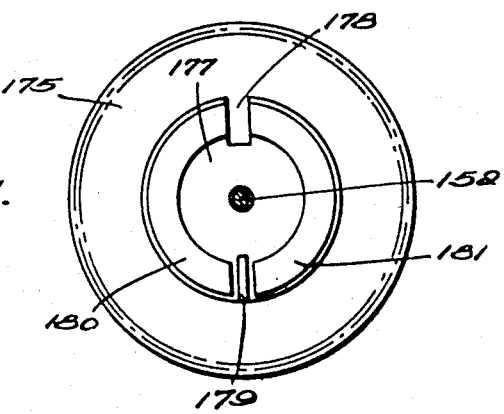
Figure 12:
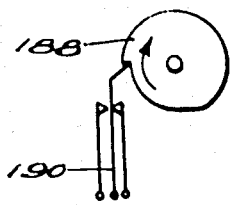
Figure 13:
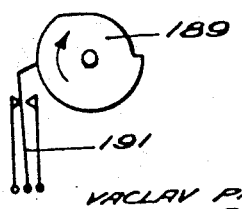

In the following, two examples of embodiments of this invention are described in detail on hand of drawings, where FIG. 1 shows a schematic layout of the master-clock in cross section, FIG. 2 a schematic cross section of the decoding analyzer, FIG. 3 an elevation thereof, FIG. 4 is a cross sectional view along the line 4—4 in FIG. 1, showing details of the zero device with the detector, FIG. 5 is a cross sectional view along the line 5—5 in FIG. 1, FIG. 6 is a cross sectional view along the line 6—6 in FIG. 1 showing details of the signal transmitter for the subsidiary clocks, FIG. 7 is cross sectional view along the line 7—7, in FIG. 1, FIG. 8 a schematic layout in cross section of another example of a master clock, FIG. 9 is a cross sectional view along the line 9—9 in FIG. 8 showing a detail of the rotor of the generator with the main synchronous motor in enlarged scale in side elevation, FIG. 10 is a cross sectional view along the line 10—10 in FIG. 8 showing a similar view upon the stator of this generator equally in enlarged scale, FIG. 11 is a cross sectional view along the line 11—11 in FIG. 8 showing a similar view of a detail of the detector, FIG. 12 is a cross sectional view along the line 12—12 in FIG. 8 showing side elevations of details of a signal transmitter to the subsidiary clocks, FIG. 13 is a cross sectional view along the line 13—13 of FIG. 8, FIG. 14 is a schematic view of the electrical circuit of the clock system embodiment shown in FIGS. 1 to 7, and FIG. 15 is a schematic view of the electrical circuit of the clock system embodiment shown in FIGS. 8 to 13.

Referring to FIGS. 1 and 2 a not shown oscillator of known design supplies the required energy at the required frequency to the synchronous motor 3 of a clock and in case of the closing of a contact by the switch 4 simultaneously to the second synchronous motor 5 (FIG. 2) which drives the decoding analyzer of time signals. Both motors are provided with a one way coupling, preventing the back movement of the motor.

The pinion 6 of the synchronous motor engages by means of suitably chosen transmissions 7, 8 with the toothed wheel 9, which transmits the movement to the intermediate shaft 10. On this shaft 10 are two firmly fixed pinions 11, 12 which engage with the outer toothed wheels 13, 14 keyed upon the parallel shaft 25, and furthermore a slidably supported first coupling disc 15 the rotating movement of which with respect to the shaft 10 is prevented by the key 16. This first coupling disc 15 is forced by the spring 17, into engagement with the second coupling disc 18 integral with the pinion 19, which can freely rotate on shaft 10. The disengagement of this coupling is achieved by means of the electromagnet 20. The pinion 19 engages over an intermediate wheel 21, the toothed wheel 22 which is mounted on shaft 35 and is part of the synchronizing control device later more fully described.

The outer toothed wheels 13, 14 rotatably mounted on the shaft 25 are provided with coupling discs 23, 24, respectively. A toothed wheel 26 with an axially extended hub, called in the following central change-over wheel, is slidably mounted on shaft 25 between said coupling discs 23, 24. This change-over wheel 26 is on both ends provided with coupling discs 28, 29. Due to the action of the spring 30 the coupling disc 29 is forced into engagement with the coupling disc 24 of the right outer wheel 14. When this coupling is disengaged by the action of the electromagnet 31 the coupling disc 28 of the change-over wheel 26 comes into engagement with the coupling disc 23 of the left outer wheel 13.

The transmission ratios of the above described arrangement are chosen so that the proper control device mounted on shaft 35 and actuated by the toothed wheel 22 makes a turn of 360° within 120 seconds while the left outer wheel 13 makes a full turn within 132 seconds and the right outer wheel 14 within 108 seconds. The central change-over wheel 26 engages the toothed wheel 32 representing the time correction element of the device and drives this wheel at a variable speed depending upon its temporary engagement with either of the two outer wheels 13, 14. With respect to the rotating speed of the shaft 35 of the control device the rotating speed of the correction element is therefore by 10% higher or lower.

The synchronzing control device comprises the said toothed wheel 22, the detector 33 and the zeroizing device as for instance a heart shaped cam 34, and is rotatably supported on the shaft 35. The heart shaped cam 34 (FIG. 4) is controlled by the leved 36 actuated by the electromagnet 37.

The disk shaped detector 33 (FIG. 5) is provided with a radial slot 38 and at one side face thereof are two mutually insulated segments 39, 40 forming an interrupted annulus. One segment 39 is connected with a circuit which cooperates with a first contact brush 41, while the second segment 40 is electrically indifferent.

A stud 43 conductively mounted in the circumference of the collector ring 44 which cooperates with a second contact brush 45 engages due to the action of the spring 42 with the slot 38. The collector ring 44 is firmly connected with the toothed wheel 46 provided with a coupling disc 47. The beforesaid elements form a mobile unit rotatably but slidably mounted on shaft 35. When the stud 43 is forced by the action of the electromagnet 48 against the force of the spring 42 out of engagement with the slot 38, the coupling disc 47 comes into engagement with the coupling disc 49 of the toothed wheel 32 which is slidingly mounted on the shaft 35. If the relative position of the teeth of both coupling discs 47, 49 prevents the full use of the depth of engagement, required for bringing the stud 43 completely out of the slot 38, then the toothed wheel 32 is pressed back i.e. to the left against the action of the spring 51.

On the shaft 52 is firmly seated the pinion 53 and a couple of cams 54, 55 (FIGS. 6 and 7) which cooperate with change over switches 58, 59 and act as impulse transmitters. The active noses of both cams 54, 55 are staggered by 180°. The pinion 53 engages over suitably chosen intermediate gears 62, 63 with the toothed wheel 46 of the said mobile unit. In case this mobile unit 44–46–47 is in the position determined by the action of the spring 42, it is taken along by the control device 32, 33 and both signal transmitters acquire the speed given by the transmission ratio, i.e. for instance one revolution in two seconds. In the contrary case, where the mobile unit is due to the action of the electromagnet 48 taken along by the time correcting element 32, their rotating speed either increases or decreases by 10%.

A wireless receiver and a decoding analyzer of time signals serve for the remote control of the described arrangement. The not shown wireless receiver is a transistor apparatus which is brought into action by closing the contact of the switch 65. Through its output, provided with a narrow band filter, can pass only the given frequency. The decoding analyzer of the time signals is arranged as illustrated in FIGS. 2 and 3.

The pinion 66 of the synchronous motor 5 engages by means of the intermediate wheel 67 with the pinion 68, which transmits the movement to the auxiliary shaft 69. This shaft supports slidingly a coupling element 70 guided by the key 71. This element 70 is forced by the spring 72 into engagement with a coupling disc 73 which is integral with the pinion 74 on shaft 69. This pinion 74 engages the toothed wheel 75 supported rotatably on the shaft 76. Its movement is derived from the movement of the synchronous motor 5 in the direction of the shown arrow (FIG. 3). Its speed is determined by the transmission ratio. When the coupling members 70, 73 are disengaged by the action of the electromagnet 77 the force of the spring 78 asserts itself and presses the wheel 75 into its initial position in which the pin 79 contacts the supporting bridge 80. By means of the pivotally supported catch 81 the wheel 75 cooperates with the ratchet wheel 82, firmly connected with the shaft 76 and maintained in consecutively adjacent positions by a countercatch 83. While the wheel 75 is a measuring element of the arrangement with a very accurate time base, the ratchet wheel 82 is a counter, the task of which is to change the position of the tongue 84 cooperating with two contacts 85, 86 of the change-over switch 87 in case exactly defined conditions occur. This task is fulfilled by means of an auxiliary pin 88. The catch 81 and the counter-catch 83 are pressed by springs, not shown, into the teeth of the ratchet wheel 82 so far that their engagement is not forcibly interrupted by the action of the limiting pins 89, 90. The ratchet wheel 82 is pressed by a return spring 92 into its initial position determined by the contact of the pin 91 with the supporting bridge 80. The counter catch 83 leaning with one arm against a contact pin 93 simultaneously limits by its second arm the angle by which the toothed wheel 75 is turned.

The above described arrangement works in the following way:

As shown in FIG. 14, the oscillator fed from supply mains, supplies current to a synchronous motor 3. Its speed is determined by the frequency of the oscillator and provides an accurate time base of the device acting as a master-clock. A series of subsidiary clocks are shown in FIG. 14.

The motor 3 drives a shaft 10 through gears 6, 7, 8 and 9. A gear 19 is mounted on the shaft 10 for rotation relative to the shaft and a clutch member 15 is keyed to the shaft and slidable axially along the shaft. Adjacent faces of the clutch member 15 and the gear 19 have teeth for engagement with each other. A spring 17 urges the clutch member 15 toward the gear 19 and an electromagnet 20, when energized, urges the clutch member 15 away from the gear 19. When the clutch member 15 is in engagement with the gear 19, the gear 19 drives the gear 21 at a uniform speed.

Another gear 11 is mounted on the shaft 10 and drives a gear 13 on an auxiliary shaft 25. The gear 13 has a ring gear 23 on its radial face. Another gear 14 is mounted for rotation relative to the shaft 25 and also has a ring gear 24 on its radial face. A clutch member 26 is slidably mounted on the shaft 25 and has gears 28 and 29 which are movable into engagement with the ring gears 23 and 24, respectively. A spring 30 urges the clutch member 26 toward the gear 14, while an electromagnet 31 when it is energized, urges the clutch member 26 toward the gear 13 and into engagement with the ring gear 23. The speed ratios of the gears 11 and 13 and the gears 12 and 14 are selected, so that the gear 13 rotates at a speed approximately 10% slower than that of the gear 21, while the gear 14 rotates at a speed approximately 10% greater than that of the gear 21.

A control shaft 35 has a clutch member 32 with a ring gear 49 formed on one face. The clutch member 32 is in driving relationship with the clutch member 26. A toothed wheel 46 is also mounted for rotation on the shaft 35 and has a gear 47 on one end for engagement with the ring gear 49. On the opposite end of the wheel 46 is a disc 44 with a stud 43 mounted therein and extending substantially parallel to the shaft 35. A spring 42 urges the wheel 46 toward the right, as viewed in FIG. 1, and an electromagnet 48 when energized, urges the wheel 46 toward the left, as viewed in FIG. 1.

A unitary gear assembly 22 is mounted for rotation on the shaft 35 and includes a gear which engages the gear 21. A disc 33 on the assembly 22 has a radial slot 38, as shown in FIG. 5, to receive the stud 43. The radial face of the disc 33 has a pair of plate contacts 39 and 40, which are insulated from each other. Also mounted on the assembly 22 is a cam 34, as shown in FIG. 4. A cam follower 36 is mounted on the frame and is in position to engage a heartshaped cam 34 on the assembly. The follower 36 is normally spring-biased away from the cam. A solenoid 37, adjacent the cam follower, may be energized to move the cam follower 36 into engagement with the cam.

The wheel 46 drives a pinion 63, and through the gears 62 and 53, it drives the shaft 52. A conventional clock mechanism may be driven directly by the shaft 52, and the gear ratios are selected to rotate the shaft 52 at a rate of one revolution per second. Two or more cams 54 and 55 are mounted on the shaft 52 for rotation therewith. The cams are shown in elevation in FIGS. 6 and 7. The cams are arranged with lobes which operates their respective switches 58 and 59 180° apart. When one of the switches is closed, a current impulse is transmitted to secondary clocks in the system.

The electromagnets 48, 20 and 37 are energized in response to a received signal to disengage the drive and to retract the stud 43 from the slot 38. The electro-magnet 37 moves the cam follower 36 against cam 34. If the cam follower does not engage the lowest portion of the cam, the force of the follower on the cam is sufficiently great to rotate the gear assembly 22 until the cam 34 reaches the position shown in FIG. 4.

The gear assembly 22 rotates relative to the shaft 35 and if the slot 38 is angularly displaced relative to the stud 43, when the electromagnet 43 is deenergized, the stud will engage one of the strips 39 or 40, depending upon whether the assembly 22 leads or lags its desired angular position. If the gear assembly 22 leads its desired position, the stud 43 will engage the strip 39 and complete an electric circuit through the brush 41, the stud 43 and the brush 45. The electromagnet 31 is included in the circuit with the brushes 41 and 45 and is thereby energized to displace the ring gear 28 so that the gear 28 meshes with the ring gear 23 to drive the clutch 32 at a slower speed than that of the gear 21. Conversely, if the assembly 22 lags its desired position, the stud 43 engages the opposite strip 40 on the disc 38 and the spring 30 urges the clutch 26 and its gear 29 into engagement with the ring gear 24 on the gear 14. Thus, the clutch 32 is driven by the gear 14 at a speed greater than that of the gear 21. Relative rotation of the disc 44 and the disc 38 continues until the stud 43 registers with the slot 38 and the spring 42 urges the clutch 46 toward the right, when viewed as in FIG. 1, and moves the stud 43 into the slot 38, thereby disengaging the gears 47 and 49. The shaft 52 is then driven by the gear 21. In this manner, the clock movement shaft 52 is corrected twice during each rotation, and the correction is effected without any perceptible change in the speed of the movement of the hands.

In case of remote control the whole arrangement works as follows:

The last impulse of the composite wireless time signal causes the excitation of the electromagnet 20, 48 and 37, which control the coupling disc 15, the transmission member with its toothed wheel 46 and the zero lever 36, respectively. Electromagnet 20 disengages against the action of the spring 17 the coupling discs 15, 18 and enables the movement of the pinion 19. Thus the proper control devise is disengaged from the influence of the intermediate shaft 10. The second electromagnet 48 shifts the stud 43 out of the slot 38 of the detector 33 against the action of the spring 42 and simultaneously causes the engagement of the coupling disc 47 with the second coupling disc 49 of the toothed wheel 32. This wheel can be pushed back against the action of the spring 51 in order to shift the stud 43 reliably out of the slot 38 even in case the relative position of the teeth of both coupling discs 47, 49 prevents to take full advantage of their depth. The third electromagnet 37 attracts the zero lever 36, which turns by means of the heart shaped cam the proper control device into a positively determined initial position.

When the last impulse of the signal combination has passed the action of the electromagnets 20, 48 and 37 is interrupted and the zero lever 36 returns due to the action of a not shown spring into its initial position in which it is out of engagement with cam 34. Simultaneously the coupling disc 15 comes due to the action of the spring 17 into engagement with the second coupling disc 18. A possible deviation is compensated and the proper control device starts again to turn at the moment determined by the time signal. By the interrupted function of the electromagnets the spring 42 is again brought into action. However due to the turning of the proper control device an angular deviation corresponding to the extent of the time deviation, which has been of course apparent in the attached system of subsidiary clocks, takes place between the stud 43 and the slot 38.

Let us suppose that the master clock is late. The heart shaped cam 34 is deviated in the direction of its travel. The changed position of the slot 38 prevents the engagement of the stud 43, which contacts the electrically indifferent segment 40 of the detector 33. The engagement of the coupling disc 47, 49 is maintained. The electromagnet 31 is deenergized and the toothed wheel 32 representing the time control device, which turns due to the action of the spring 30 by means of the right outer wheel 14, takes along the transmission member 44–46–47 at an increased speed and its toothed wheel 46 drives over the described transmission the two cams 54, 55 by 10% faster. Thus the signal transmitter compensates the time lag shown in the system of the subsidiary clocks by reduced time intervals in a way which is imperceptible to the eye. The extent of this compensation which corresponds to the extent of the deviation, is determined by the position of the stud 43, which slides due to the action of the spring 42 along the segment 40 of the detector 33 until its position identifies itself with the slot 38 due to the difference of their angular speeds and the stud 43 comes into engagement. Thus the coupling discs 47, 49 become disengaged. The time lag has been compensated and the proper control device takes over by means of the toothed wheel 46 the drive of the subsidiary clocks.

In case the master-clock is fast, the heart shaped cam 34 is deviated in the opposite direction, i.e. against the direction of its movement. The change position of the slot 38 again prevents the engagement of the stud 43, which contacts the second segment 39 of the detector 33 connected over the brush 41 with one pole of the power supply. The coupling discs 47, 49 remain in engagement. As the stud 43 is conductively connected with the circumference of the collector ring 44, the electromagnet 31, permanently connected over the brush 45 with the second pole of the power source, is excited. Due to its action the time controlling toothed wheel 32 is turned by the left outer wheel 13. Thus it takes along with a reduced angular speed the transmission member comprising the toothed wheel 46 and the same drives over the described transmission the couple of cams 54, 55 by 10% slower. Thus the signal transmitter reduces the advance in a similarly imperceptible way in the system of subsidiary clocks by a slight prolongation of the time intervals. The extent of compensation which exactly corresponds to the extent of the deviation, is again determined by the stud 43. This stud slides over the segment 39 of the detector 33 due to the action of the spring 42 until its position due to the difference of angular speeds identifies with that of the slot 38 and the stud 43 comes into engagement therewith. Thus the coupling discs 47, 49 are disengaged. The advance has been compensated and the proper control device cares again by means of the toothed wheel 46 for the drive of the subsidiary clocks.

Thus the proper control device determines the character and extent of the present deviation and defines the way of compensation by means of the detector 33 in cooperation with the stud 43.

The remote control is therefore achieved by the last impulse of the signal combination. This is achieved by a wireless receiver which cooperates with a decoding analyzer of the time signals.

The synchronous motor 5 drives the auxiliary shaft 69, as shown in FIGS. 2 and 3, the coupling element 70 is mounted on the shaft 69 and the key 71 causes the coupling element to turn with the shaft, but it is free to slide axially along the shaft. The spring 72 urges the coupling element 70 toward the right as shown in FIG. 2. The pinion 74 is freely mounted on the shaft 69 and has a ring gear 73 which is in position to engage a corresponding gear on the coupling element 70. The pinion 74 drives the toothed wheel 75, which is mounted for rotation on a shaft 76. The wheel 75 is driven in the direction of the arrow in FIG. 3 by the synchronous motor 5. An electromagnet 77 urges the coupling element 70 out of engagement with the gear 73 when the electromagnet is energized, and the torsional spring 78 rotates the wheel 75 in a direction opposite to that of the arrow in FIG. 3 until the pin 79 engages the supporting bridge 80.

The rachet wheel 82 is also secured on the shaft 76 and a pivotally supported catch 81 is mounted on the wheel 75 in position to engage the ratchet wheel 82. The counter catch 83 is spring biased toward the rachet wheel 82 and operates as an escapement mechanism. The auxiliary pin 88 on the ratchet 82 is in position to engage the tongue 84 of a single pole double throw switch 87. As the wheel 75 rotates in the direction of the arrow, limiting pins 89 and 90 rotate the catch 81 and the counter catch 83 out of engagement with the ratchet wheel. The coil spring 92 urges the ratchet wheel clockwise as viewed in FIG. 3 until the pin 91 engages the supporting bridge 80. At the same time, the pin 89, which engages the counter catch 83, prevents further rotation of the wheel 75, since the counter catch 83 abuts against the pin 93.

When the signal pulse is received, the electromagnet 77 is energized by means of the closed contacts 84, 85 of the switch 87. The gears 70 and 73 become disengaged and this allows the toothed wheel 75 to return under the action of the spring 78 to its initial position determined by the contact of the pin 79 with the bridge 80. The change of position of the limiting pin 89 allows the counter catch 83 to engage the teeth of the ratchet wheel 82. Simultaneously, the locked synchronous motor 5 is released and starts to move.

In response to a subsequent signal or pulse, the electromagnet 77 is deenergized and the disc 70 is displaced into engagement with the ring gear 73 to drive the wheel 75. The catch 81 is carried by the wheel 75 and turns the ratchet wheel until it advances one tooth. Then a second impulse is received which energizes the electromagnet 77 again and the process is repeated. Thus, the toothed wheel 75 acts as a control element during a limited time interval, while the ratchet wheel 82 counts the number of repetitions of the signal. The cycles continue until the pin 88 engages the tongue 84 of the switch 87 and the last impulse of the signal moves the contact 84 into engagement with the opposite pole 86 of the switch, thereby closing the circuits of the electromagnets 20, 48 and 37 of the master clock. Since the switch contacts 84 and 85 are open the electromagnet 77 is not energized and the gears 70 and 73 remain in engagement to drive the wheel 75 until the limiting pins 89 and 90 interrupt the engagement of the catch 81 and the counter catch 83. Thus, while the time correction is being made on the master clock, the ratchet wheel 82 returns to its initial position with the contact pin 91 in engagement with the supporting bridge 80. The wheel 75 remains in its adjusted position and does not rotate backward although the synchronous motor 5 is not turning because of the one way coupling of this synchronous motor.

It is obvious from the specification and from the drawings that the compensation of the originated time deviation is achieved only by a control time signal of a specific frequency for instance 1000 cycles, the course of which signal must be maintained to its minute details. The output of the wireless receiver, provided with a narrow band filter prevents the passage of other frequencies. The sequence of the prescribed number of impulses, required for the reversal of the tongue 84 of the change-over switch 87 must be maintained within exactly stipulated intervals. In case any of the intervals would be longer, the ratchet wheel 82, which would not be turned for the respective angle, prevents the engagement of the counter-catch 83 and returns into its initial position. The impulse not registered will of course be lacking in the prescribed number and prevents the reversing of the tongue 84 of the change-over switch 87.

In the opposite case, when one of the intervals surpasses the given length, the limiting pins 89, 90 lift the catch 81 and the counter-catch 83 and the ratchet wheel 82 returns immediately into its initial position.

The described system therefore allows to pass the last element of the signal combination after a previous detailed checking of the given sequence of the whole time signal and excludes reliably any wrong adjustment due to parasitic influences.

The master-clock is thus controlled solely by the expected time signal. The compensation takes place to the subsidiary clocks. The arrangement effects the compensation of the whole coordinated system, driven in arbitrary chosen intervals, completely independent upon the extent of the deviation.

The master-clock can therefore drive the subsidiary clocks in intervals of one second even in case a rather simple oscillator with an accuracy of $1.10^{-4}$ is used. The occurred difference, systematically compensated by the current time signals, transmitted for instance every six hours does not surpass 2 seconds. If in case of a failure of the transmitter or in case of an occasional fading a temporary failure of the remote control takes place, the deviation is doubled or trebled eventually, depending upon the number of omitted time signals. The deviaiton will be however, compensated notwithstanding of that by the next correct signal.

In case the said clock system has to be installed in circumstances, where a more perfect time orientation is required, an oscillator of a higher accuracy, say $10^{-5}$ can be used. In that case the time deviation does not attain one second even if three time signals fail and the remote control takes place only once in 24 hours.

But even an oscillator of this higher accuracy remains within the range of cheap devices, which cannot be used for the individual long term measuring of time. On the other hand there is its simplicity and low frequency, corresponding to the frequency required for current synchronous motors, which does not need any frequency divider. Thus its operating reliability with respect to expensive oscillators of high accuracy is substantially increased.

The master-clock can correct a positive or negative deviation of 55 seconds, determined by the angular speed of the proper control device. Thus it becomes a completely independent time unit, which can be remotely controlled even after two months, i.e. even in case 240 time signals are omitted. A failure of such an extent is of course improbable.

The second example of embodiment shown in FIG. 8 to 13 and 15 uses as time base an oscillator, which supplies the required power and frequency to the main synchronous motor 110 and at the moment of closing the contact by the switch 111 simultaneously to the synchronous motor 112. Both motors are provided with a one-way clutch, which prevents the back movement of the rotor. The synchronous motor 110 is supported rotatably. Its stator is firmly connected with a toothed wheel 113 and with two collector rings 114, 115 cooperating with brushes 116, 117. These brushes serve for a continuous current supply even in case the stator of the said motor 110 is deliberately turned. On the other hand the auxiliary synchronous motor 112 is arranged stable. One of its pinions 118 engages with a toothed wheel 119, forming a firm unit with the second toothed wheel 120.

Both toothed wheels 119, 120 are firmly fixed on the shaft 121, where the clutch disc 122, taken along by the stud 123 of the toothed wheel 120 is rotatably arranged. The clutch disc 122 is due to the action of the spring 124 in engagement with the second clutch disc 125 firmly connected with the rotatably arranged pinion 126, which engages with the toothed wheel 113. The disconnection of the engagement of both clutch discs 122, 125 is achieved by the electromagnet 127. The toothed wheel 120 engages with the toothed wheel 128, firmly fixed on the shaft 129 on which the clutch disc 130 taken along by the stud 131 of the toothed wheel 128 is rotatably arranged. The cultch disc 130 is due to the action of the spring 132 in engagement with the second clutch disc 133 firmly connected with a rotatably arranged pinion 134, which also engages with the toothed wheel 113. The disengagement of both clutch discs 130, 133 is achieved by a second electromagnet 135.

The transmission ratios of the said arrangement have been chosen so, that the main synchronous motor 110 is in case of excitation of electromagnet 127 turned against the direction of movement of its rotor and in case of excitation of the second electromagnet 135 in the opposite direction. In both cases the angular velocity of the stator is for instance for 90% smaller than the operating angular speed of its rotor. When none of both electromagnets 127, 135 is excited, the reverse direction of transmission of the pinions 126, 134 safeguards a perfect stability of the rotatably arranged stator of the main synchronous motor 110.

The second pinion 136 of the auxiliary synchronous motor 112 engages by means of suitably chosen transmissions 137, 138 with the toothed wheel 139 which transmits the movement to the shaft 140. This shaft supports in sliding fashion a coupling disc 141, safeguarded in the radial direction by the key 142. This coupling disc 141 is due to the action of the spring 143 disconnected from the second coupling disc 144, which forms a solid unit with a rotatably arranged pinion 145. The engagement of both coupling discs 141, 144 is achieved suitably by means of one electromagnet with two windings. In the further part of the specification both windings will be dealt with as two independent electromganets 146, 147.

The pinion 145 engages with the toothed wheel 148, firmly connected with the collar 149 and with the collector ring 150. This collector ring 150 is provided with a feeler 151 which is in conductive connection with the circumference of this collector. The whole unit represents a time determinator, rotatably supported by the shaft 152 and in one direction controlled by the pressure of the spring 153. The wheel 148 is provided with a hole 154 which in an exactly determined position enables by the action of the electromagnet 155 its axial shifting with respect to the setting shaft 156, which mechanically prevents its rotational movement. The catch 157, one arm of which is forced by a spring, not shown on the drawing, into the orbit of the collar 149, cooperates by means of its second arm with the sleeve 158. This sleeve is firmly connected with the setting shaft 156, the movement of which is in one direction determined by the pressure of the spring 159, in the opposite direction by the action of the electromagnet 160. The collector ring 150 cooperates with the respective brush 161.

The pinion 162 of the synchronous motor 110 is firmly connected with the disc 163. This disc, see FIG. 9, is the rotor of the generator 164; the stator 165, see FIG. 10, said generator includes a coil 166 with the winding 167, the core of which is a permanent magnet 168. The rotor and stator are provided with the same number of teeth 169, 170, which can be shaped so that the alternative component of the magnetic field has some required, for instance a sine course. The same pinion 162 engages by means of the transmission gears 171, 172 and 173, 174 with a toothed wheel 175, which is a stable part of the detector. The transmission ratio between the main synchronous motor 110 and the toothed wheel 175 of the detector is equivalent with the transmission ratio between the auxiliary synchronous motor 112 and the toothed wheel 148 of the time determinator.

The detector, see FIG. 11, comprises said toothed wheel 175 and two collector rings 176, 177 which form a solid unit, supported rotatably by the shaft 152. One collector ring 177 is provided with a radial recess 178 and a diametrically arranged projection 179. It bears on its lateral side two insulated segments 180, 181, forming an interrupted annular ring. One segment 180 is conductively connected with its circumference, cooperating with a brush 182, the second segment 181 is conductively connected with the collector ring 176 cooperating with the second brush 183. The toothed wheel 175 engages by means of suitably chosen transmissions 184, 185 with the pinion 186 firmly fixed on a shaft 187. On this shaft a couple of cams 188, 189, see FIGS. 12 and 13, is arranged, cooperating with change-over switches 190, 191 representing impulse transmitters. The active recesses of both cams 188, 189 are relatively staggered for 180 degrees. The arrangement is completed by two switches 192, 193 and by one change-over switch 194, the tongue 195 of which closes in its rest position one contact 196 and in its active position the second contact 197.

The remote control is achieved by a wireless receiver and by a decoding analyzer of time signals as described in connection with the foregoing example.

The said arrangement works as follows:

Referring to FIGS. 8 to 13 and 15, an oscillator supplied from a power source, drives by means of brushes 116, 117 cooperating with collector brushes 114, 115, the main synchronous motor 110. It revolutions, determined by the frequency of the oscillator, are a direct expression of its accuracy and form a time base of the arrangement, which takes over the task of the master-clock.

The pinion 162 of the synchronous motor 110 takes along a firmly connected disc 163. Due to its rotation the resistance in the magnetic circuit of the generator 164 is changed and thus also the magnitude of its magnetic flux. Changes of this magnetic flux induce in the winding 167 of the coil 166 an alternating voltage, the frequency of which is determined by the product of the number of teeth and of the number of revolutions of the rotor 169. Thus the generator 164 picks up the angular speed of the main synchronous motor 110 and by a suitably chosen number of teeth drives with the required frequency by means of the not shown amplifier or amplifiers any number of synchronous motors. They represent a silently moving system of subsidiary clocks of the frequency type.

It is selfunderstood that the proposed electromagnetic method of picking up the angular speed can be replaced by a coincident capacitive or electrodynamic solution.

By means of the said transmissions the same pinion 162 drives simultaneously the toothed wheel 175 which is an integral part of the detector. The toothed wheel 175 drives furthermore over further transmissions 184, 185 the pinion 186, which causes the rotation of the shaft 187. This shaft takes along a couple of cams 188, 189 cooperating with change-over switches 190, 181. Due to the transmission ratios the detector 177 rotates at a speed of one revolution in 120 seconds, while the cams 188, 189 turn at a speed of one revolution in two seconds. Their active recesses which are relatively symmetrically staggered influence the corresponding change-over switches 190, 191 so that they drive in the function of a signal transmitter the subsidiary clocks at intervals of one second, at a regular change of the direction of current. Their number limited by the torque of the shaft 187, or by the main synchronous motor 110 determines the number of directly controlled subsidiary clocks without the use of auxiliary relays. The described arrangement represents therefore a system of subsidiary clocks of the frequency system.

As the movement of both joint systems is determined by the revolutions of the main synchronous motor 110, i.e., by the common driving element, it is evident that their movement is necessarily coincident.

In a not shown manner one of the shafts of the machine influences three switches 111, 192, 193 and one change-over switch 194. The switches 111, 192, 193 close their contacts and the change-over switch 194 changes the positions of the tongue 195 in arbitrary adjustable time intervals for a predetermined time of closing. So far instance one minute prior to the expected wireless correcting signal the master clock closes the contacts of the three switches 111, 192, 193. The switch 111 closes the circuit of the auxiliary synchronous motor 112, the second pole of which is directly connected with an oscillator not shown in the drawing. Its movement is however prevented mechanically by the self-locking property of the transmission comprising the pinions 126, 134. The other switches 192, 193 bring into action a wireless receiver and a decoding analyzer of time signals, as has been described in connection with the first embodiment. They accomplish a remote regulation of the said device by the reception of the last element of the signal combination.

It is selfunderstood that the shaft 187 can by means of suitable transmissions drive also the pointers of a control clock.

In case of remote control the whole arrangement works as follows:

The last element of the wireless time signal excites the electromagnet 160. This magnet shifts against the action of the spring 159, i.e., to the left, the setting shaft 156 which prolongs its engagement with the toothed wheel 148. Its sleeve 158 turns clockwise the catch 157 beyond the course of the collar 149. Thus the spring 153 becomes free to act and the time determinator 150 is shifted to the left towards the detector 177. Due to the prolonged locking engagement of the setting shaft 156 with the toothed wheel 148 its radial position remains unchanged. In case the master-clock has a time deviation, the feeler 151 contacts with one of the two segments 180, 181. One of these segments 180 is by means of the collector ring 177 and brush 182 permanently connected with two electromagnets 127, 146 and the second segment 181 by means of the second collector ring 176 and brush 183 with the electromagnets 135, 147. These electromagnets are permanently connected with one pole of the current supply.

By means of the contact 196 of the change-over switch 194 which is closed in the rest position of the tongue 195, the brush 161 and consequently also the collector ring 150 are connected with the second pole of the same current source. Thus the feeler 151 which is conductively connected with the circuit of the collector ring 150 excites in accordance with the character of the present deviation either the electromagnets 127, 146 connected in the described way with one segment 180, or the electromagnets 135, 147 connected with the second segment 181. In both cases the couple of clutch discs 141, 144 comes into engagement and the rotatably supported pinion 145 becomes dependent upon the action of the auxiliary synchronous motor 112. Simultaneously one of both electromagnets 127, 135 becomes excited depending upon with which of the segments the feeler 151 has come into contact. Due to its action one or the other of the couples of clutch discs 122, 125 and 130, 133 become disengaged. The described self-locking is removed, but the auxiliary synchronous motor remains at rest, mechanically held by the setting shaft 156.

When last element of the signal combination ends, the function of the electromagnet 160 is interrupted, the setting shaft 156 is shifted to the right due to the action of the spring 159 into its original position and the catch 157, pressed by means of a spring not shown in the drawing, contacts the circumference of the collar 149. The locking action being thus removed the auxiliary synchronous motor 112 starts to move. The time determinator 150 starts therefore to move with the operating speed of the machine exactly at the moment, determined by the time information. The angular difference between the feeler 151 and the recess 178 of the detector 177 corresponds however to the extent of the time deviation which of course shows in both joined systems of subsidiary clocks.

The wireless correction is achieved and the master-clock cuts out by disconnecting contacts of both switches 192, 193 simultaneously the wireless receiver and the decoding analyzer of time signals as described above.

In case the master clock becomes late, the recess 178 of the detector does not achieve the position corresponding to the exact time. The feeler 151 contacts one of the segments 181 and excites in the described manner both electromagnets 135, 147. While the electromagnet 147 causes the engagement of the clutch disc 141, 144, the electromagnet 135 disengages the clutch discs 130, 133. Thus at the moment when in coincidence with the time information the time determinator 150 starts to move, the released pinion 134 enables the rotation of the toothed wheel 113, driven by the second pinion 126. The wheel 113 takes along the stator of the main synchronous motor 110 in the direction of the movement of its rotor at an angular speed which is 90% lower than the operating speed of both motors 110, 112. The revolutions of the pinion 162 rotating with the sum of the speeds of the rotor and stator, are therefore by 10% increased. The rotor 163 of the generator 164 of course takes part at this change and by means of the described transmissions also the toothed wheel 175 and the couple of cams 188, 189.

Thus the generator 164 picks up at a correspondingly increased frequency the time lag of one clock system, while the cams 188, 189 at a conformingly increased speed reduce in a way imperceptible to the eye the intervals of seconds and in the function of a signal transmitter picks up the time lag of the second clock system.

The time within which the correction corresponding to the extent of the deviation is achieved, is determined by the action of the feeler 151. By the action of the spring 153 it slides along the segment 181 of the detector 177, until its position identifies itself with the recess 178 and the feeler 151 engages into this recess. Thus the function of the electromagnet 135, 147 is interrupted. The clutch discs 130, 133 come again into engagement due to the action of the spring 132 and the stator of the main synchronous motor 110 comes to rest; the newly asserted influence of the spring 143 interrupts the engagement of the second clutch discs 141, 144 and the toothed wheel 148 released from the influence of the mechanically stopped auxiliary motor 112 is taken along by the detector 177. The time lag is removed and the main synchronous motor 110 drives in the described way both joined systems of subsidiary clocks at the operating speed which is the time base of the master-clock.

In case the master-clock is advanced, the recess 178 of the detector 177 overtakes the position corresponding to the correct time. The feeler 151 contacts the second segment 180 and excites in the described way both electromagnets 127, 146. While electromagnet 146 causes the clutch discs 141, 144 to engage, the second electromagnet 127 disengages clutch discs 122, 125. Thus at the moment when in coincidence with the time information the time determinator 150 starts to move, the released pinion 126 enables the rotation of the toothed wheel 113 driven by the second pinion 134. The wheel 113 takes along the stator of the main synchronous motor 110 against the direction of movement of its rotor at an angular speed again 90% lower than the operating angular speed of both motors 110, 112. The revolutions of the pinion 162, which rotates at the rotor speed reduced by the opposite speed of the stator, are therefore for 10% reduced. This change is of course followed by the rotor 163 of the generator 164 and by means of the described transmissions also by the toothed wheel 175 and by the couple of cams 188, 189.

Thus the generator 164 brakes by a proportionally reduced frequency the advance of one clock system, while the cams 188, 189 prolong in a manner imperceptible to the eye the intervals of seconds by a proportionally reduced speed and in the function of an impulse transmitter it brakes the advance of the second clock system.

The time of correction corresponding to the extent of the deviation is again determined by the action of the feeler 151. The feeler slides due to the action of the spring 153 along the segment 180 of the detector 177, until its position coincides with the recess 178 and the feeler 151 engages this recess. Thus the function of the electromagnets 127, 146 is interrupted. The clutch discs 122, 125 come again into engagement due to the action of the spring 124 and the stator of the main synchronous motor 110 comes to rest; the newly asserted influence of the spring 143 interrupts the engagement of the second clutch discs 141, 144 and the toothed wheel 148 released from the influence of the mechanically stopped auxiliary motor 112, is again taken along by the detector 177. The advance is equalized and the main synchronous motor 110 drives again in the described way both joint systems of subsidiary clocks at the operating speed, which is the time base of the master clock.

The control has been achieved by a speed change accomplished so that the thus caused change of frequency of the generator 164 maintains a continuous dependance of the voltage induced in the winding 167 of the coil 166. The task has been fulfilled without regards to the character of the occurred deviation and the master clock cuts out the auxiliary sychronous motor 112 by interrupting contacts of one switch 111. Simultaneously it changes the position of the tongue 195 of the change-over switch 194. This switch interrupts the connection of the brush 161 with one pole of the power source by disconnecting the rest contact 196. Thus it eliminates any electric influence of a transistory contact of the feeler 151 with the lateral wall of either segment 180, 181 at the amount of its removal from the recess 178 of the detector 177. On the contrary by closing the working contact 197 the electromagnet 155 is energized which is permanently connected with the second pole of the same power source. This influences the time determinator 150 which shifts the feeler 151 from the recess 178 of the detector 177 by an axial movement against the action of the spring 153. The toothed wheel 148 leans against the setting shaft 156 and the determinator 150 is temporarily stopped. It remains in the rest position until the projection 179 of the rotating detector 177 starts again to be taken along by means of the feeler 151. The toothed wheel 148 slides thereby along the setting shaft 156 until it comes into a position, where its hole 154 enables to finish the axial shifting due to a prolonged action of the electromagnet 155. The feeler 151 is disengaged from the influence of the porjection 179 and the setting shaft 156 safeguards by a renewed engagement with the toothed wheel 148 its radial position.

The master clock changes the position of the tongue 195 of the change-over switch 194 to the rest position. The action of the electromagnet 155 is interrupted by the disconnection of the contact 197. The catch 157 takes over the axial stabilisation, the arm of which, pressed by a spring not shown on the drawing comes again within the orbit of the collar 149. Thus the time determinator 150 awaits in a precisely determined position a futrher signal of the wireless information.

On hand of the arrangement according to this invention it has been first enabled to combine in a single master clock the impulse and frequency drive and use in a clock system controlled thereby and influenced by wireless time signals arbitrary either rather economical subsidiary clocks with an impulse drive for instance at intervals of seconds, or in case of need subsidiary clocks with frequency drive, which are expensive in operation, but have a silent movement. Simultaneously a universal time unification is achieved on the whole territory of the state both for stable and for mobile objects.

We claim:

1. A system of clocks including a master clock and a number of subsidiary clocks actuated thereby comprising means for periodic correction by a time signal composed of a combination of impulses transmitted by wireless, an oscillator serving as time base for the drive of a main synchronous driving motor of the master clock and for the drive of a decoding analyzer of the received time signals, said main synchronous motor provided with a stator capable to be rotated and an auxiliary synchronous motor for the regulating of the angular speed of said main synchronous motor.

2. A system of clocks as in claim 1, comprising furthermore two transmission gears with prior determined transmission ratios for the drive of the stator of said main synchronous motor over normally engaged clutches, maintaining said stator normally at standstill, means for disengaging one of said clutches in accordance with the character of the registered time deviation, causing thus an increase or decrease of the angular speed of said main synchronous motor.

3. A system of clocks as in claim 1, comprising furthermore two transmission gears with prior determined transmission ratios for the drive of the stator of said main synchronous motor over normally engaged clutches, maintaining said stator normally at standstill, means for disengage one of said clutches in accordance with the character of the registered time deviation, causing thus an increase or decrease of the angular speed of said main synchronous motor, an impulse system for the transmission of control inpulses to subsidiary clocks actuated by said main synchronous motor.

4. A system of clocks as in claim 1, comprising furthermore two transmission gears with prior determined transmission ratios for the drive of the stator of said main synchronous motor over normally engaged clutches, maintaining said stator normally at standstill, means for disengaging one of said clutches in accordance with the character of the registered time deviation, causing thus an increase or decrease of the angular speed of said main synchronous motor, a frequency generator, a transmission for the drive of said frequency generator by said main synchronous motor, said frequency generator generating electric current at a predetermined normal, increased or reduced frequency for the drive of subsidiary clocks with normal, increased or reduced speed in accordance with the registered time deviation.

5. A system of clocks including a master clock and a number of subsidiary clocks actuated thereby comprising means for periodic correction by a time signal composed of a combination of impulses transmitted by wireless, an oscillator serving as time base for the drive of a main synchronous driving motor of the master clock and for the drive of a decoding analyzer of the received time signals, said main synchronous motor provided with a stator capable to be rotated and an auxiliary synchronous motor for the regulating of the angular speed of said main synchronous motor, a time determinator in the shape of a disc supported in sliding fashion on a shaft, coupling means for coupling of said time determinator with said auxiliairy synchronous motor, a catch maintaining said time determinator in its initial position, a setting shaft engaging in said time determinator and preventing its angular movement, means for release of said time determinator in accordance with the receipt of the active correction signal.

6. A clock system as in claim 5, said time determinator provided with a feeler, said detector provided with two mutually insulated segments forming an interrupted annular ring, said feeler contacting in case of release of said time determinator one of said segments and electromagnetic means actuated by said action and closing electric circuits causing an increase or decrease of speed of said main synchronous motor.

7. A system of clocks including a master-clock device and a series of subsidiary clocks actuated thereby, comprising means for periodic correction by a time signal composed of a combination of impulses transmitted by wireless; a control device for analyzing the received time signal so that only a certain combination of said impulses will actuate said correction means; means to determine the extent and character of any deviation of the master-clock device from the correct time; and correction means comprising a clutch system adapted to transmit a movement to the master-clock device at, respectively, a normal increased or reduced speed in dependence upon the determined deviation until coincidence with the correct time is established.

8. A system of clocks including a master-clock device and a series of subsidiary clocks actuated thereby comprising means for periodic correction by a time signal composed of a combination of individual impulses transmitted by wireless; means for analyzing the received time signal; an intermittent drive for said analyzing means; an oscillator serving as time base for the drive of the master-clock device and for said intermittent drive; and transmission and coupling means adapted to transmit to said master-clock device a movement at, respectively, normal, increased or reduced speed in dependence upon the determined deviation until coincidence with the correct time has been established.

9. A system of clocks including a master-clock device and a series of subsidiary clocks actuated thereby comprising means for periodic correction by a time signal composed of a combination of impulses transmitted by wireless; means for analyzing the received time signal and an intermittent drive therefor; an oscillator serving as time base for the drive of said master-clock device and for said intermittent drive; clutch means associated with said analyzer; a toothed wheel driven by said clutch means; a ratchet wheel arranged coaxially with said toothed wheel; a first catch rotatably mounted on said toothed wheel and adapted to engage the teeth of said ratchet wheel; a second or counter catch adapted to engage the teeth of the ratchet wheel and to limit the rotation thereof in one direction by one tooth; limiting pins on said toothed wheel for lifting said first and said second catch, respectively, out of engagement with the ratchet wheel; a change-over switch; and an auxiliary pin on said ratchet wheel controlling said switch.

10. In a system of clocks including a master clock device and at least one series of subsidiary clocks actuated thereby, the master clock being controlled by correct time indicating signals transmitted by wireless; the combination comprising means for receiving such correct time indicating signals; means operable to prepare a change of the speed of the master clock device in the event of any deviation thereof from the correct time; means operable to determine the character and the extent of any such deviation from the correct time; and means operable, in dependence upon the determined character of any such deviation, temporarily to decelerate or accelerate the subsidiary clocks until the whole system is in coincidence with the correct time; said last named means, in the case of susbidiary clocks driven by impulses, supplying impulses at a slightly decreased or a slightly increased rate and, in the case of synchronously driven subsidiary clocks, slightly decreasing or increasing the supply frequency thereto.

11. In a system of clocks including a master clock device, drive means therefor and a plurailty of subsidiary clocks actuated thereby, control means comprising means for periodic correction by a time signal composed of a combination of individual impulses transmitted by wireless; means for analyzing the received time signal; a detector indicating the character and extent of any deviation of the master clock device with respect to the correct time; means for temporary changing the speed of the drive means of the master clock device in accordance with the detected deviation; transmission means associated with and clutches controlled by the detector and driven by the driving means of the master clock device; a zeroing device associated therewith and adapted to restore the normal speed of the driving means of the master clock device after the determined deviation has been eliminated.

12. In a system of clocks according to claim 11 the further improvement comprising a zeroing device including a heart shaped disc integral with the detector and a zeroing lever controlling said disc to set the control means into starting position.

13. Apparatus for corretcing time errors in a clock system wherein a master clock receives periodic time signal pulses comprising means for rotating a time drive shaft at a substantially uniform speed, means for periodically disengaging said rotating means from said drive shaft in response to said signal pulses, means for determining an error in the speed of said rotating means, and means for modifying the speed of said rotating means in response to said determined error, whereby the master clock is corrected periodically.

14. Apparatus for correcting time errors in a clock system wherein a master clock receives periodic time signal pulses comprising a time drive shaft, first means for rotating a first member at a substantially uniform speed, second means for rotating a second member selectively at a speed greater and less than said first rotating means, means for determining an error in the speed of said first member, clutch means for engaging one of said first and second members in response to said error determining means, and means forming a driving connection between said clutch means and said time drive shaft, whereby the speed of thed rive shaft is adjusted for error in time.

15. Apparatus for correcting time errors in a clock system wherein a master clock receives periodic time signal pulses comprising a time drive shaft, first means for rotating a first member at a substantially uniform speed, second means for rotating a second member selectively at a speed greater and less than said first rotation means, a cam on said first member, a cam follower adjacent said cam, electromagnetic coil means for urging said follower against said cam in response to said time signal pulses, said cam and follower cooperating to rotate said cam to a predetermined position, clutch means between said first and second members, means for selecting the speed of said second member in response to the relative position of said clutch means and said cam, and means forming a driving connection between said clutch means and said time drive shaft, whereby the speed of the second member is selected in response to the error in the speed of said first member.

16. Apparatus for correcting time errors in a clock system wherein a master clock receives periodic time signal pulses comprising a time drive shaft, first means for rotating a first member at a substantially uniform speed, second means for rotating a second member selectively at a speed greater and less than said first rotation means, a cam on said first member, a cam follower adjacent said cam, electromagnetic coil means for urging said follower against said cam in response to said time signal pulses, said cam and follower cooperating to rotate said cam to a predetermined position, a disc on said first member, said disc having a radial slot therein, clutch means between said disc and said second member, a stud on the clutch means in position to engage said slot, means for displacing said stud out of said slot simultaneously with energizing said electromagnetic coil means, means for connecting said clutch means with said second member upon displacement out of said slot, and means forming a driving connection between said clutch means and said time drive shaft, whereby the second member drives the time drive shaft to correct an error in the speed of the first member.

17. Apparatus for correcting time errors in a clock system wherein a master clock receives periodic time signal pulses comprising a timed drive shaft, first means for rotating a first member at a susbtantially uniform speed, second means for rotating a second member selectively at a speed greater and less than said first rotating means, a cam on said first member, a cam follower adjacent said cam, electromagnetic coil means for urging said follower against said cam in response to said time signal pulses, said cam and follower cooperating to rotate said cam to a predetermined position, a disc on said first member, said disc having a radial slot therein, said first member and said second member being mounted for rotation on a common shaft, a clutch on said shaft between said first and second members, a stud on the clutch and extending outwardly from one end thereof substantially parallel to said shaft, said stud being in position to move into and out of said slot upon axial displacement of said clutch, means on the opposite end of said clutch for engaging said second member, means for axially displacing said clutch toward said second member simultaneously with energizing said electromagnetic coil means, means for maintaining said clutch in engagement with said second member while the error in speed of the first member is being corrected, and means forming a driving connection between said clutch and said time drive shaft to correct an error in the speed of the first member as determined by said cam and follower.

18. Apparatus for correcting time errors in a clock system wherein a master clock receives a periodic time signal pulse comprising means for rotating a first shaft at a substantially uniform speed, a second shaft, first and second gears on said second shaft, primary transmission gear means for turning said first gear by said rotating means, secondary transmission gear means for turning said second gear by said rotating means, a time drive shaft, clutch means on said second shaft between said first and second gears, means for driving said time drive shaft by said clutch means, means for temporarily disconnecting said primary gear means, means for determining error in the desired angular position of said first gear, and means for maintaining said clutch in engagement with said second gear while an error is being corrected, said secondary transmission means including means for increasing and decreasing selectively the speed of the clutch means, whereby an error in the speed of the first gear may be corrected.

19. Apparatus for analyzing a series of time signal pulses and operating a switch at predetermined time intervals comprising a toothed wheel, means for rotating the wheel at a substantially uniform rate, a ratchet wheel, means mounting the ratchet wheel for rotation adjacent said toothed wheel, a pawl, means mounting the pawl on said tooth wheel for engaging said ratchet wheel, a counter catch in position to engage said ratchet wheel, means on said tooth wheel for disengaging said pawl and said counter catch upon rotation of said tooth wheel, a support bridge, stop means on said ratchet wheel and said toothed wheel for limiting rotation of said wheels in one direction beyond perdetermined angular positions, means for biasing said wheels in said one direction, switch means having a movable contact member, secondary stop means for limiting rotation of said toothed wheel in a direction opposite to said one direction, means on said ratchet wheel for engaging said contact member upon rotation of the ratched wheel to a predetermined angular position, whereby the switch member is displaced at uniform intervals by rotation of the ratchet wheel.

References Cited by the Examiner
UNITED STATES PATENTS

| | | | |
|---|---|---|---|
| 1,310,779 | 7/19 | Bryce | 58—24 |
| 1,310,780 | 7/19 | Bryce | 58—24 |
| 1,657,105 | 1/28 | Bryce | 58—24 |
| 1,760,631 | 5/30 | Bryce | 58—24 |
| 1,777,745 | 10/30 | Bryce | 58—24 |
| 1,928,793 | 10/33 | Poole | 318—16 |
| 2,506,766 | 5/50 | Bortelink | 179—2.5 |
| 2,614,383 | 10/52 | Pfeffer | 58—24 |
| 3,004,381 | 10/61 | Schweitzer | 58—24 |

LEO SMILOW, *Primary Examiner.*

JOSEPH P. STRIZAK, LEYLAND M. MARTIN,
*Examiners.*